(12) United States Patent
Okada et al.

(10) Patent No.: US 11,569,544 B2
(45) Date of Patent: Jan. 31, 2023

(54) BATTERY PACK AND ELECTRIC VEHICLE

(71) Applicant: HONDA MOTOR CO., LTD., Tokyo (JP)

(72) Inventors: Tomoyuki Okada, Saitama (JP); Tomofumi Yasuda, Saitama (JP); Hiroki Itaya, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 194 days.

(21) Appl. No.: 17/200,269

(22) Filed: Mar. 12, 2021

(65) Prior Publication Data

US 2021/0288378 A1    Sep. 16, 2021

(30) Foreign Application Priority Data

Mar. 16, 2020 (JP) .............................. JP2020-045580

(51) Int. Cl.
*B60K 1/02* (2006.01)
*H01M 50/317* (2021.01)
(Continued)

(52) U.S. Cl.
CPC ............. *H01M 50/317* (2021.01); *B60K 1/04* (2013.01); *H01M 10/482* (2013.01);
(Continued)

(58) Field of Classification Search
CPC ............. H01M 50/317; H01M 10/482; H01M 10/486; H01M 50/204; H01M 50/249;
(Continued)

(56) References Cited

U.S. PATENT DOCUMENTS 9,905,823 B2 * 2/2018 Maeda ................ H01M 10/425
10,236,486 B2 * 3/2019 Kim .................... H01M 50/264
(Continued)

FOREIGN PATENT DOCUMENTS

CN     107206890 A     9/2017
JP     2004-039582 A   2/2004
(Continued)

OTHER PUBLICATIONS

Oct. 26, 2022, Chinese Office Action issued for related CN Application No. 202110252887.3.

*Primary Examiner* — James M Dolak
*Assistant Examiner* — James J Triggs
(74) *Attorney, Agent, or Firm* — Paratus Law Group, PLLC

(57) ABSTRACT

A battery pack includes a first battery case accommodating a plurality of cells, and a second battery case laminated above the first battery case and accommodating a plurality of cells. The first battery case has a first through-hole on an upper surface. The second battery case has a second through-hole on a bottom surface which communicates with the first through-hole. The battery pack includes a communication port composed of the first through-hole and the second through-hole, a gas discharge valve which is provided only in either the first battery case or the second battery case and opens when internal pressure of the battery pack is higher than a predetermined value, and a temperature sensor provided on a gas flow path connected to the gas discharge valve.

11 Claims, 10 Drawing Sheets

(51) Int. Cl.
*H01M 10/48* (2006.01)
*H01M 50/204* (2021.01)
*H01M 50/249* (2021.01)
*B60K 1/04* (2019.01)

(52) U.S. Cl.
CPC ....... *H01M 10/486* (2013.01); *H01M 50/204* (2021.01); *H01M 50/249* (2021.01); *B60K 2001/0438* (2013.01); *H01M 2200/20* (2013.01); *H01M 2220/20* (2013.01)

(58) Field of Classification Search
CPC ................ H01M 2200/20; B60K 1/04; B60K 2001/0438
See application file for complete search history.

(56) References Cited

U.S. PATENT DOCUMENTS

| | | | |
|---|---|---|---|
| 10,312,490 B2 * | 6/2019 | Maguire | H01M 50/3425 |
| 2010/0213741 A1 * | 8/2010 | Suzuki | B62D 25/2036 |
| | | | 296/193.07 |
| 2011/0311848 A1 * | 12/2011 | Garascia | H01M 50/20 |
| | | | 429/87 |
| 2013/0192914 A1 * | 8/2013 | Nakamori | B60K 1/04 |
| | | | 180/68.5 |
| 2015/0214524 A1 * | 7/2015 | Takasaki | H01M 50/50 |
| | | | 429/82 |
| 2016/0020447 A1 * | 1/2016 | Janarthanam | H01M 10/613 |
| | | | 180/68.5 |
| 2016/0099451 A1 | 4/2016 | Murai et al. | |
| 2017/0288187 A1 * | 10/2017 | Maguire | H01M 50/209 |
| 2018/0015806 A1 | 1/2018 | Yasuda et al. | |
| 2019/0157851 A1 * | 5/2019 | Okamoto | H01G 11/10 |
| 2020/0076019 A1 | 3/2020 | Ohkuma | |
| 2020/0076026 A1 | 3/2020 | Ohkuma | |

FOREIGN PATENT DOCUMENTS

| | | |
|---|---|---|
| JP | 2007-027011 A | 2/2007 |
| JP | 2012-015121 A | 1/2012 |
| JP | 2016-072171 A | 5/2016 |
| JP | 2016-091691 A | 5/2016 |
| JP | 2017-050237 A | 3/2017 |
| JP | 2020-035709 A | 3/2020 |
| JP | 2020-035710 A | 3/2020 |

* cited by examiner

BATTERY PACK AND ELECTRIC VEHICLE

CROSS-REFERENCE TO RELATED APPLICATION

The present application claims the benefit of priority of Japanese Patent Application No. 2020-045580, filed on Mar. 16, 2020, the content of which is incorporated herein by reference.

TECHNICAL FIELD

The present invention relates to a battery pack and an electric vehicle equipped with the battery pack.

BACKGROUND ART

In a recent year, electric vehicles using a motor as a drive source have been known. In this type of electric vehicle driven by a motor, a plurality of battery modules composed of stacking a plurality of battery cells are arranged inside a battery case to supply electric power to the motor.

Since a battery pack mounted on the electric vehicle may be used in an extremely harsh environment, it is possible to conceive that the battery cell may generate heat called thermal runaway due to an internal short circuit or the like. When thermal runaway occurs, the battery cell generates heat and releases gas to the outside of the cell, that is, inside the battery pack, via a gas release valve provided in the battery cell. Generally, the battery pack has a closed structure, so when the pressure inside the battery pack increases, it is necessary to discharge gas to the outside of the battery pack.

For example, in the battery pack described in JP2016-072171A, it is described that a duct portion is provided in a bracket for fixing the vertically arranged battery modules to a frame and gas is led out from the duct portion to a discharge space inside a frame member.

However, when the battery pack is provided with the duct portion, the number of parts increases and the battery pack itself becomes large. In addition, when thermal runaway occurs in the battery cell, it is desirable to appropriately detect the occurrence of thermal runaway.

SUMMARY

The present invention provides a battery pack and an electric vehicle which can appropriately detect the occurrence of thermal runaway and suppress the increase in size of the battery pack.

According to an aspect of the present invention, there is provided a battery pack including:
a first battery case accommodating a plurality of cells; and
a second battery case laminated above the first battery case and accommodating a plurality of cells, where
the first battery case has a first through-hole on an upper surface,
the second battery case has a second through-hole on a bottom surface which communicates with the first through-hole, and
the battery pack includes.
a communication port composed of the first through-hole and the second through-hole,
a gas discharge valve which is provided only in either the first battery case or the second battery case and opens when internal pressure of the battery pack is higher than a predetermined value, and
a temperature sensor provided on a gas flow path connected to the gas discharge valve.

According to another aspect of the present invention, there is provided an electric vehicle which includes the battery pack according to the above, where
the battery pack is arranged below a floor panel, and
the gas discharge valve is provided on a lateral side of the battery pack in a vehicle width direction.

According to the present invention, when thermal runaway of the battery cell occurs, gas can be appropriately discharged without increasing the size of the battery pack and the occurrence of the thermal runaway can be appropriately detected at that time.

DESCRIPTION OF EMBODIMENT

Figure 1:
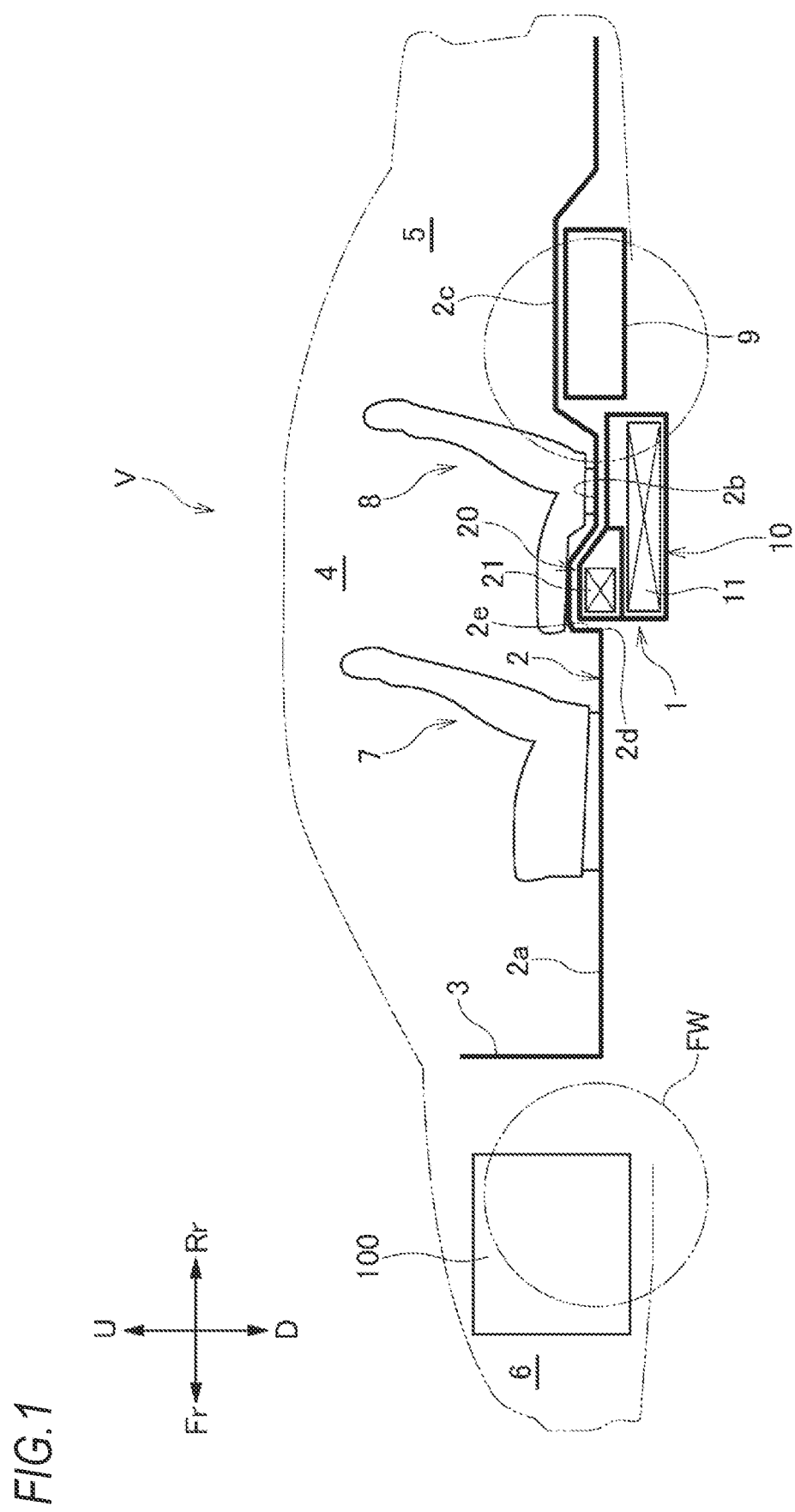
FIG. 1 is a schematic side view of a vehicle equipped with a battery pack according to an embodiment of the present invention.

Hereinafter, an embodiment of a battery pack and an electric vehicle of the present invention will be described with reference to the accompanying drawings. In the drawing, the front of the electric vehicle is shown as Fr, the rear is shown as Rr, the left side is shown as L, the right side is shown as R, the upper side is shown as U, and the lower side is shown as D.

As illustrated in FIG. 1, a vehicle V is divided into a passenger compartment 4, a luggage compartment 5, and a front room 6 in front of them by a floor panel 2 and a dash panel 3. The passenger compartment 4 is provided with a front seat 7 and a rear seat 8. The front room 6 is provided with a drive device 100 including an engine and an electric motor as drive sources for driving left and right front wheels FW and a fuel tank 9 connected to the engine is provided below the luggage compartment 5. That is, the vehicle V is a so-called hybrid vehicle which uses both an engine and an electric motor as drive sources.

A battery pack 1 connected to the electric motor is arranged below the floor panel 2 of the passenger compartment 4. The floor panel 2 is composed of a front floor portion 2a below the front seat 7, a rear floor portion 2b below the rear seat 8, and a luggage floor portion 2c below the luggage compartment 5. Between the front floor portion 2a and the rear floor portion 2b, a bent portion 2d which bends from the front floor portion 2a and a vertical wall portion 2e which extends upward from the bent portion 2d are provided. The battery pack 1 is arranged below the rear floor portion 2b.

Figure 2:
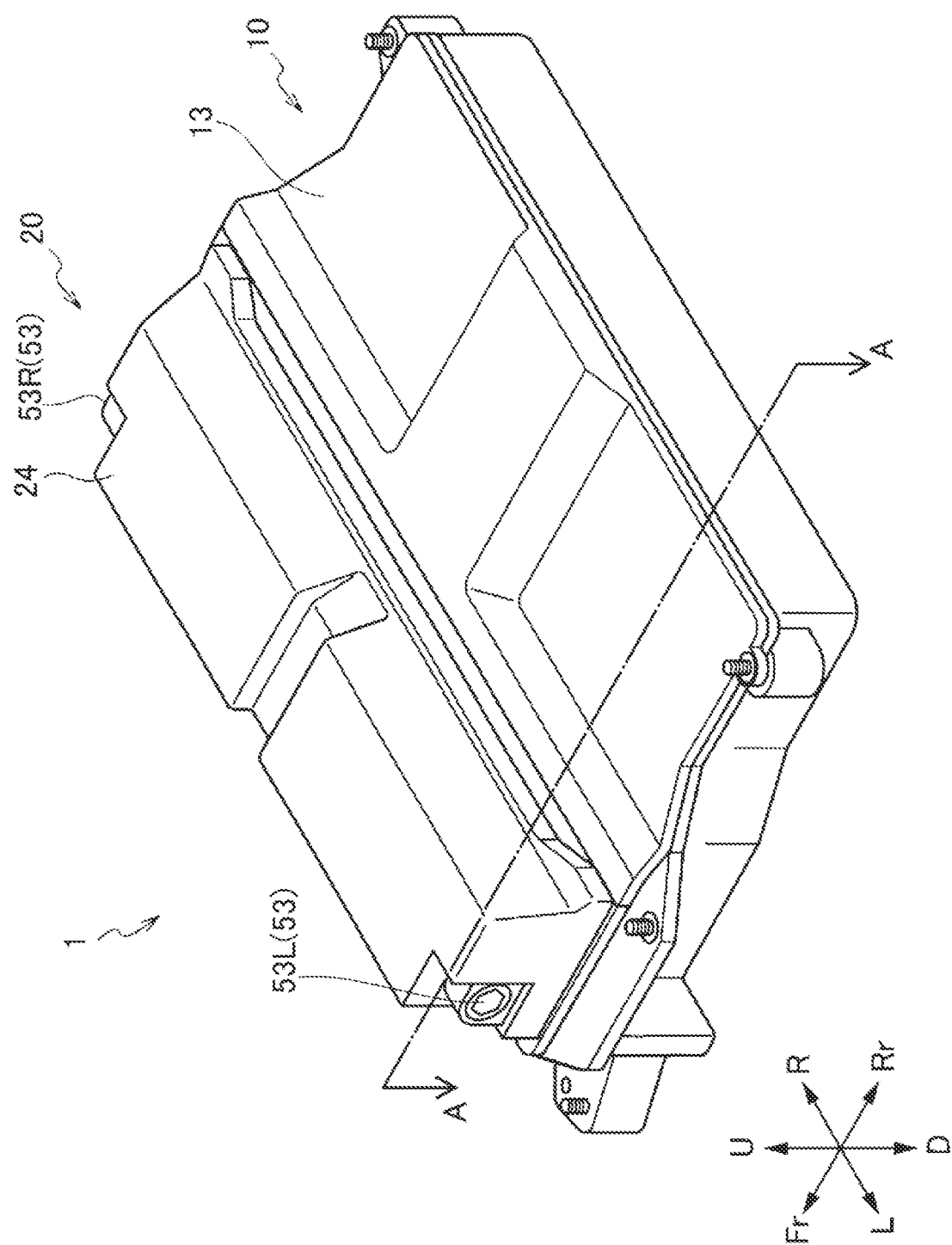
FIG. 2 is a perspective view of the battery pack of FIG. 1.
Figure 3:
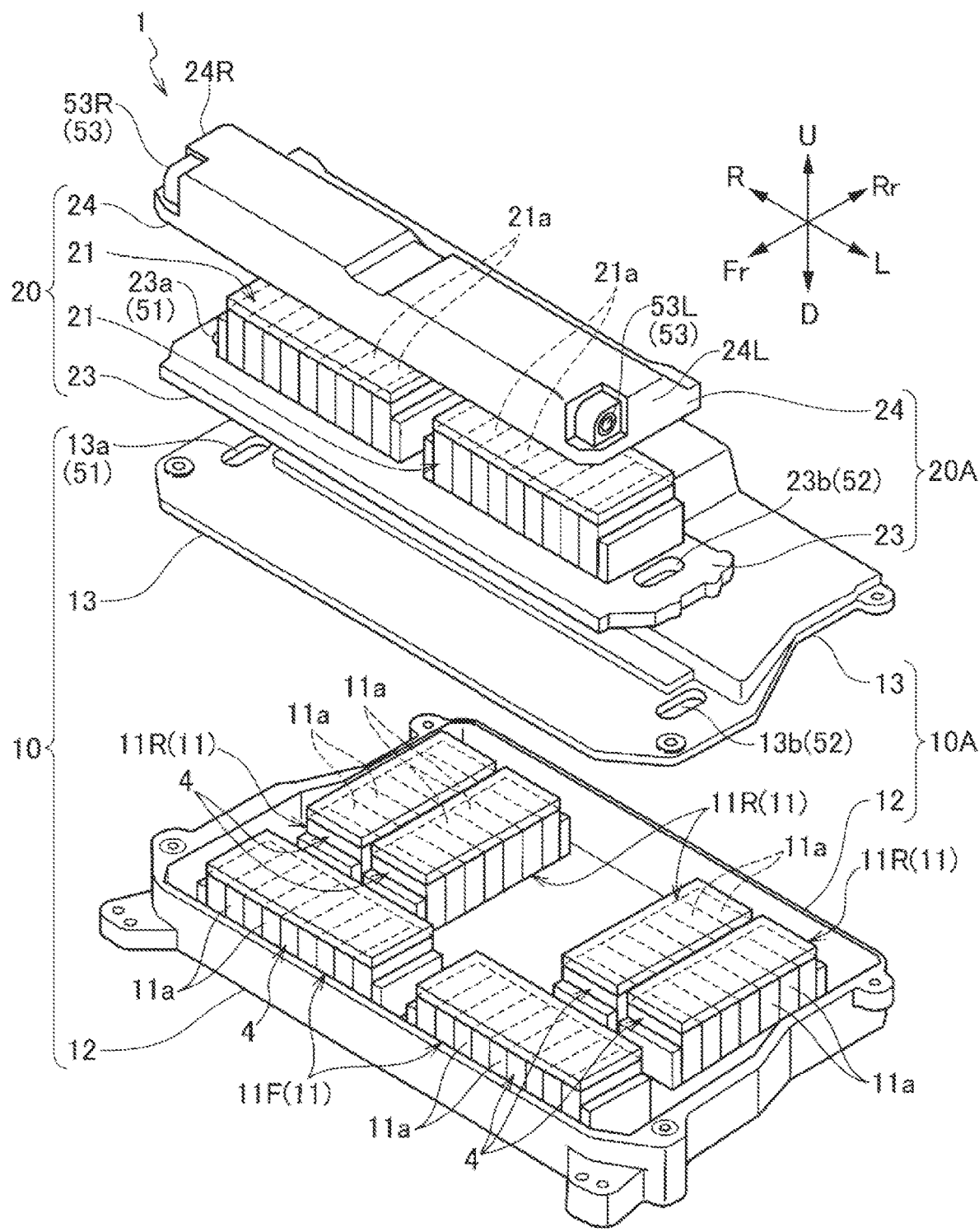
FIG. 3 is an exploded perspective view of the battery pack of FIG. 1.

As illustrated in FIGS. 2 and 3, the battery pack 1 of the embodiment includes a first battery pack 10 and a second battery pack 20 arranged above the first battery pack 10.

The first battery pack 10 includes a plurality of (six in this example) battery modules (hereinafter referred to as "first battery modules") 11 and a first battery case 10A for accommodating the first battery module 11. The first battery case 10A is composed of a first case body 12 and a first case cover 13 which closes an opening portion on an upper side of the first case body 12.

As illustrated in FIG. 3, the first battery module 11 is configured by stacking a plurality of battery cells 11a. Two first battery modules 11 are arranged side by side in front of the first battery case 10A so that a stacking direction of the battery cells 11a is parallel to a left-right direction (hereinafter, those two first battery modules 11 may be referred to as "first front battery modules 11F"). Further, four first battery modules 11 are arranged side by side from the center to the rear of the first battery case 10A so that the stacking direction of the battery cells 11a is parallel to a front-rear direction (hereinafter, those four first battery modules 11 may be referred to as "first rear battery modules 11R").

The second battery pack 20 includes two battery modules (hereinafter referred to as "second battery modules") 21 and a second battery case 20A for accommodating the second battery modules 21. The second battery case 20A includes a bottom plate 23 on which the two second battery modules 21 are installed and a second case cover 24 which covers the bottom plate 23.

The second battery module 21 is configured by stacking a plurality of battery cells 21a and the two second battery modules 21 are arranged side by side in the second battery case 20A so that the stacking direction of the battery cells 21a are parallel to the left-right direction.

The second battery case 20A is arranged so as to be overlapped above the first battery case 10A, so that the second battery pack 20 is arranged above the first battery pack 10. Further, the second battery pack 20 is arranged on a front side of the first battery pack 10. Therefore, as illustrated in FIG. 1, the height of the battery pack 1 is high in the front and low in the rear, and thus the battery pack 1 is aligned with the seat surface of the rear seat 8. This allows the battery pack 1 to be placed under a seat of the vehicle without compromising occupant comfort.

Figure 4:
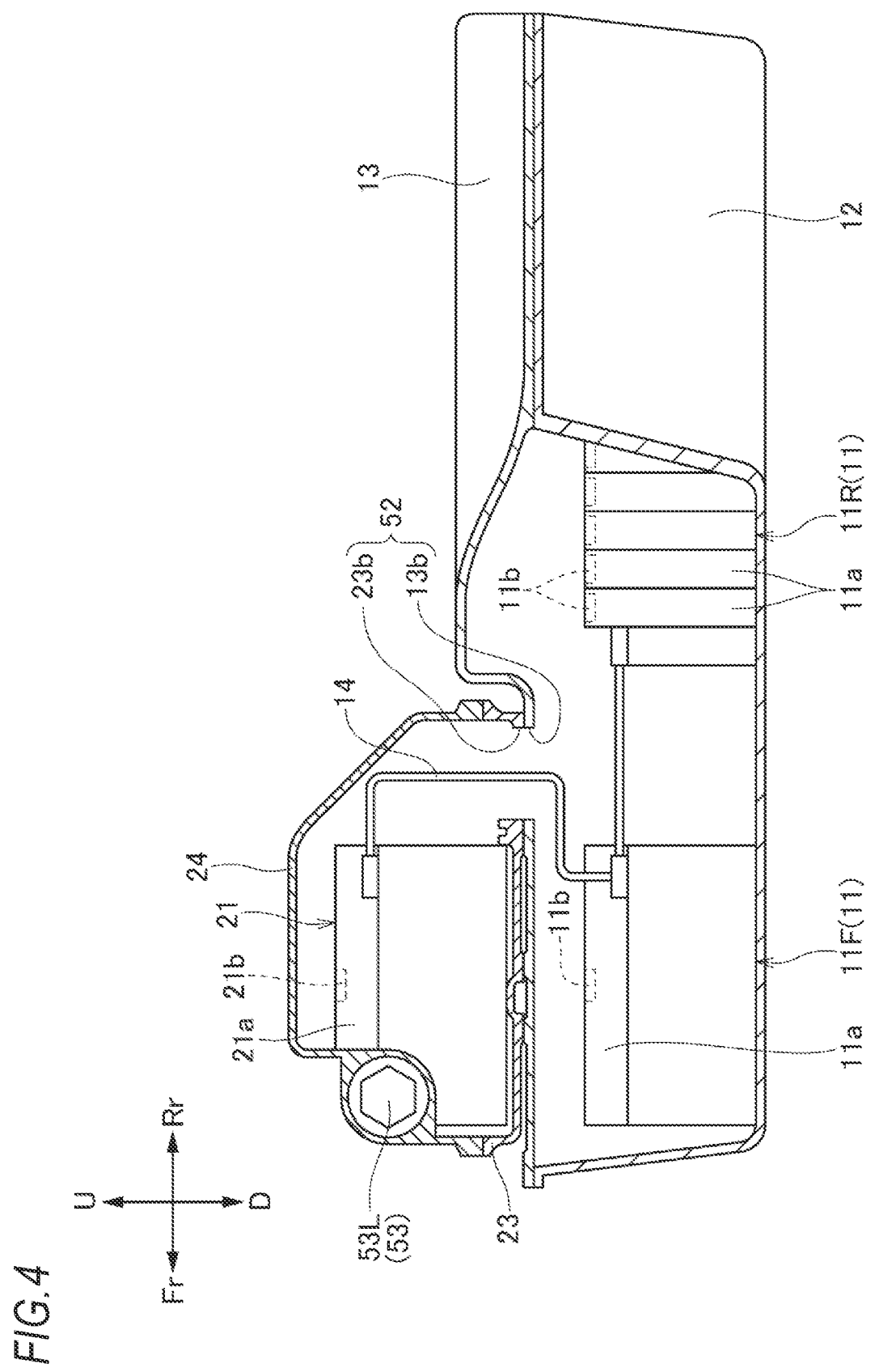
FIG. 4 is a cross-sectional view taken along the line A-A of FIG. 2.

As illustrated in FIG. 3, a right through-hole 13a and a left through-hole 13b penetrating the first case cover 13 are provided in the vicinities of both ends of the first case cover 13 in the left-right direction. A right through-hole 23a and a left through-hole 23b penetrating the bottom plate 23 are provided in the vicinities of both ends of the bottom plate 23 of the second battery pack 20 in the left-right direction. The right through-hole 13a of the first case cover 13 and the right through-hole 23a penetrating the bottom plate 23 communicate with each other to form a first communication port 51. Further, the left through-hole 13b of the first case cover 13 and the left through-hole 23b penetrating the bottom plate 23 communicate with each other to form a second communication port 52. As a result, internal spaces of the first battery case 10A and the second battery case 20A communicate with each other through the first communication port 51 and the second communication port 52. As illustrated in FIG. 4, a conductive member 14 for electrically connecting the first battery module 11 and the second battery module 21 is arranged in the first communication port 51 and the second communication port 52. As a result, the plurality of first battery modules 11 of the first battery case 10A and the plurality of second battery modules 21 of the second battery case 20A are electrically connected.

The first battery pack 10 and the second battery pack 20 are fixed in a sealed state by fastening the first case cover 13 of the first battery case 10A and the bottom plate 23 of the second battery case 20A with a fastening member (not illustrated).

Gas Discharge Structure

Next, a gas discharge structure of the battery pack 1 will be described with reference to FIGS. 2 to 8.

As illustrated in FIG. 4, gas release valves 11b and 21b are provided on the upper surfaces of each battery cell 11a of the first battery module 11 accommodated in the first battery case 10A and each battery cell 21a of the second battery module 21 accommodated in the second battery case 20A. When heat generation called thermal runaway occurs in the battery cells 11a and 21a due to an internal short circuit or the like and the internal pressure increases, gas is released to the outside of the battery cells 11a and 21a, that is, to the inside of the battery pack 1 via the gas release valves 11b and 21b.

Therefore, the battery pack 1 is provided with a gas discharge valve 53 which opens when the internal pressure of the battery pack 1 is higher than a predetermined value. At least one gas discharge valve 53 is provided only in one of the first battery case 10A and the second battery case 20A. In the embodiment, two gas discharge valves 53 are provided only in the second battery case 20A.

Figure 5:
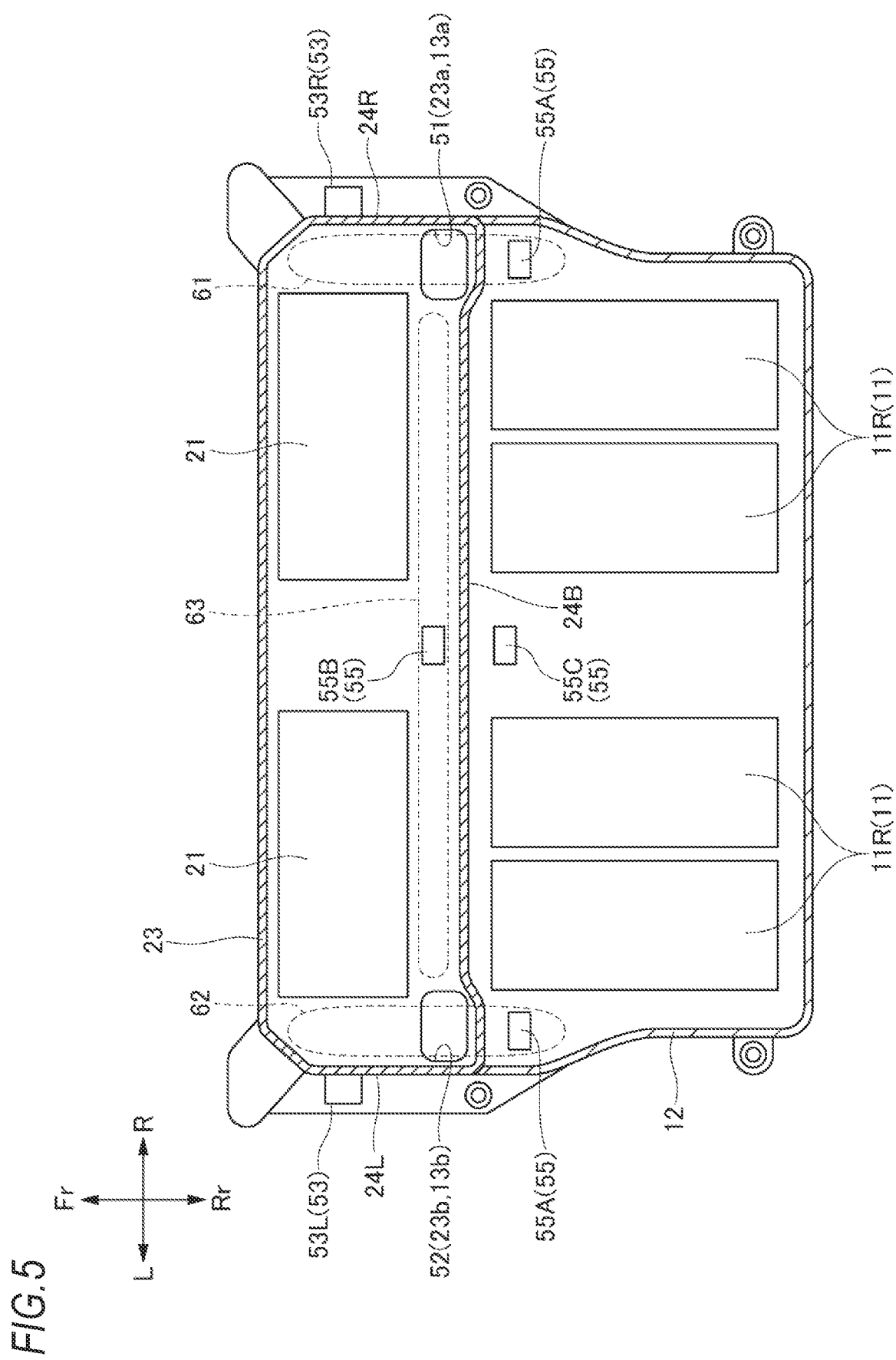
FIG. 5 is a plan view of the battery pack with a first case cover and a second case cover removed.

More specifically, as illustrated in FIG. 5, the gas discharge valve 53 includes a first gas discharge valve 53R and a second gas discharge valve 53L. The first gas discharge valve 53R is arranged on a right surface 24R of the second case cover 24 of the second battery case 20A and the second gas discharge valve 53L is arranged on a left surface 24L of the second case cover 24 of the second battery case 20A.

Figure 6:
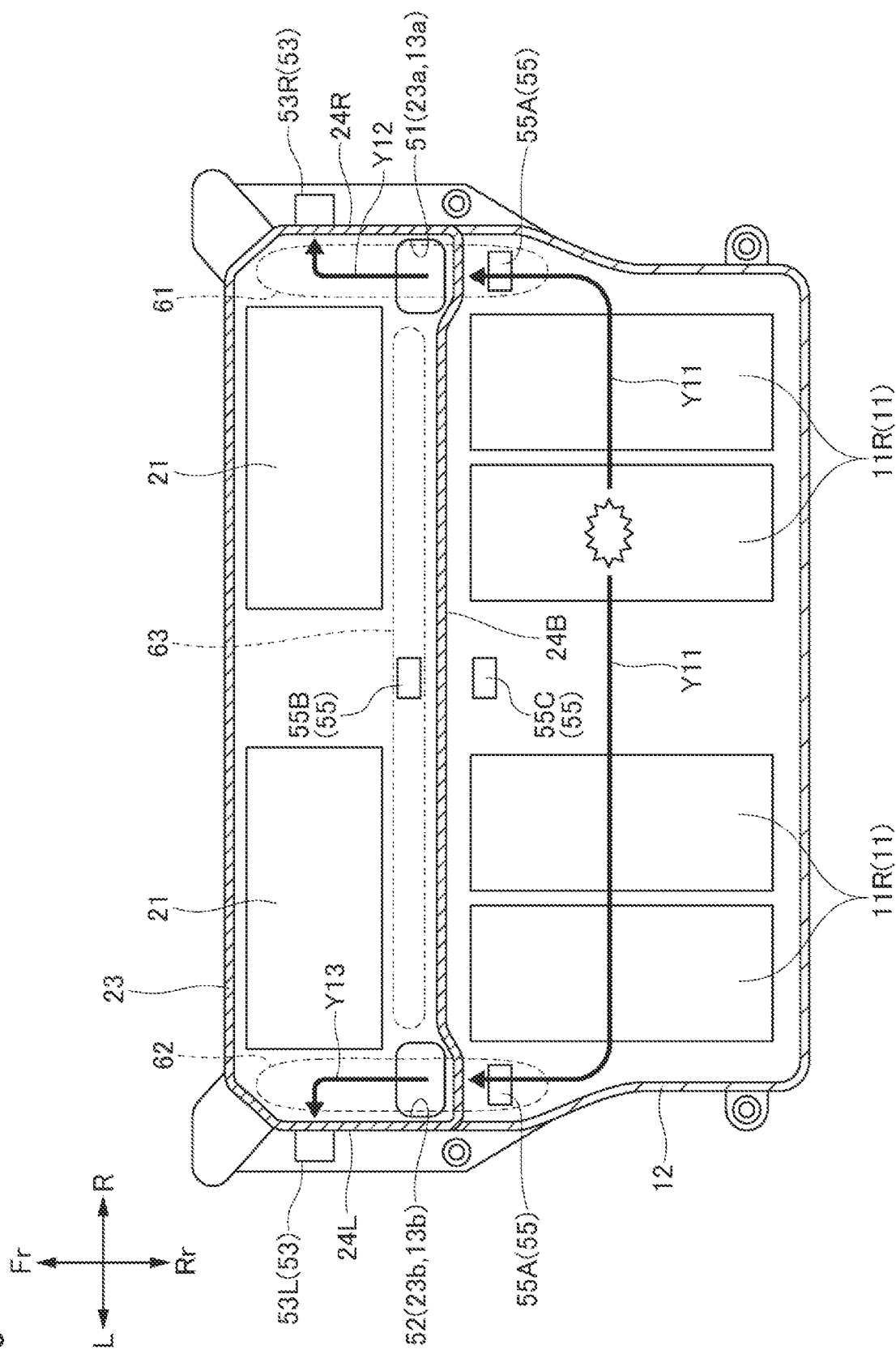
FIG. 6 is a diagram illustrating a gas flow when thermal runaway occurs in a battery cell of a first battery pack.

Therefore, when thermal runaway occurs in any battery cell 11a of the first battery case 10A and gas is ejected, as illustrated in FIG. 6, a part of the gas is mainly discharged from the first gas discharge valve 53R through a path between the first battery module 11 on the right side and the right surface of the first case body 12, the first communication port 51, a path between the second battery module 21 on the right side and the right surface 24R of the second case cover 24 (arrows Y11 and Y12 in FIG. 6). In addition, this path may be referred to as a first gas flow path 61 below.

Further, the rest of the gas is mainly discharged from the second gas discharge valve 53L through a path between the first battery module 11 on the left side and the left surface of the first case body 12, the second communication port 52, a path between the second battery module 21 on the left side and the left surface 24L of the second case cover 24 (arrows Y11 and Y13 in FIG. 6). In addition, this path may be referred to as a second gas flow path 62 below.

Figure 7:
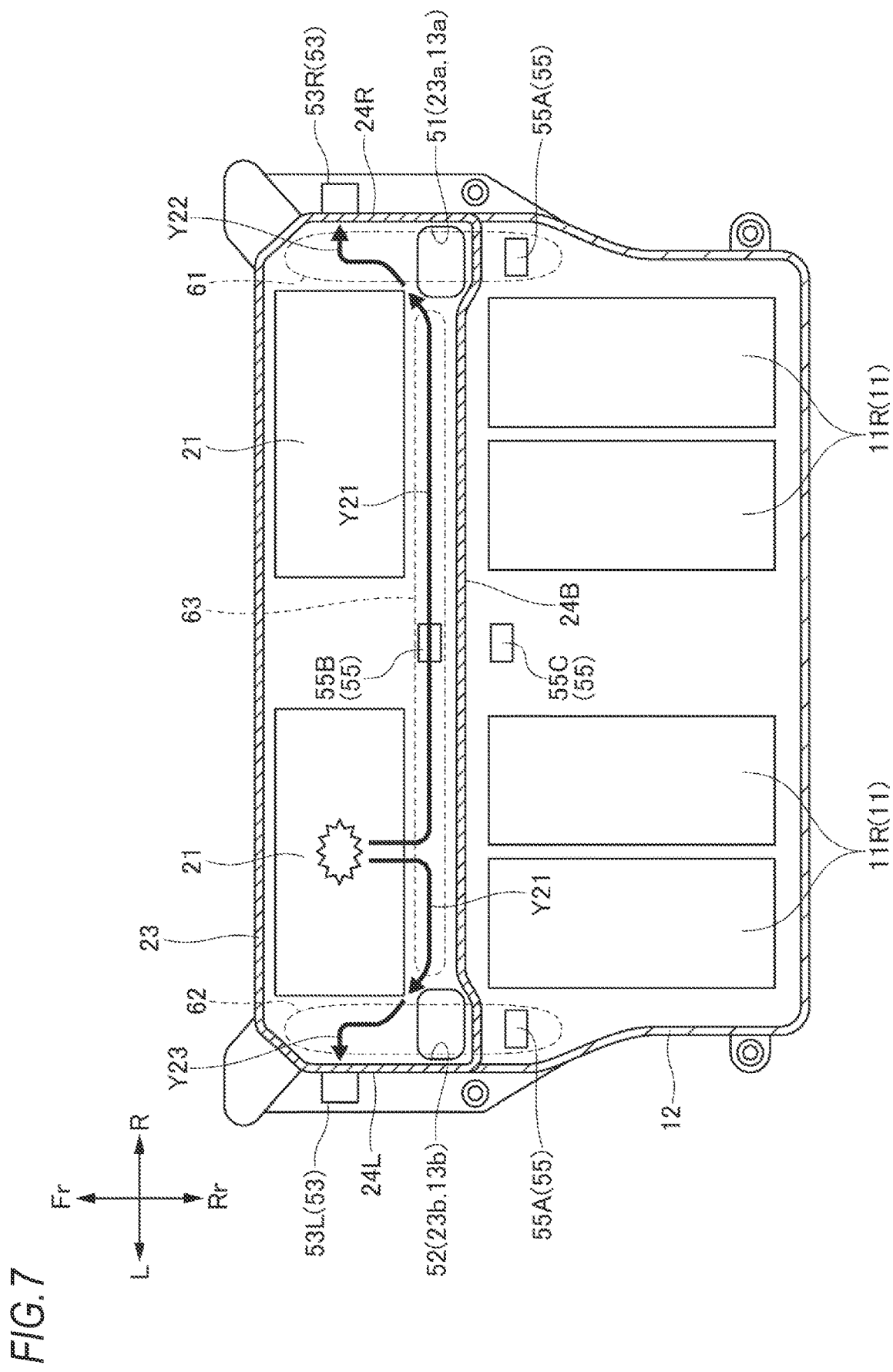
FIG. 7 is a diagram illustrating a gas flow when thermal runaway occurs in a battery cell of a second battery pack.
Figure 8:
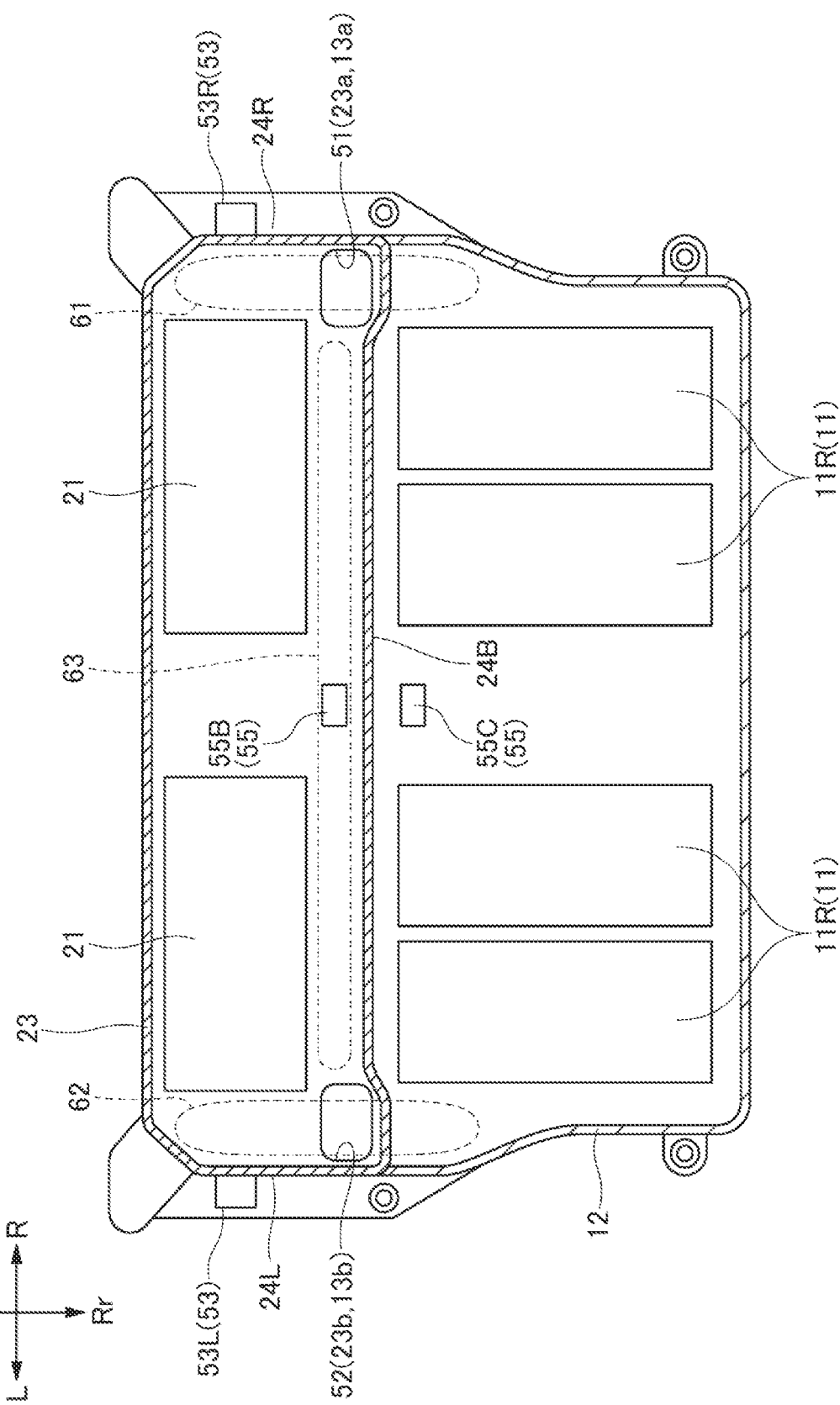
FIG. 8 is a plan view of a battery pack of a first modification example with a first case cover and a second case cover removed.

Further, as illustrated in FIG. 7, when thermal runaway occurs in any battery cell 21a of the second battery case 20A and gas is ejected, mainly, the gas flows through a path (hereinafter, may be referred to as "third gas flow path 63") between the rear surface of the left and right second battery modules 21 and a rear surface 24B of the second case cover 24 (arrow Y21 in FIG. 7). Then, the gas is discharged from the first gas discharge valve 53R through the first gas flow path 61 of the second battery case 20A (arrow Y22 in FIG.

7) and is discharged from the second gas discharge valve 53L through the second gas flow path 62 (arrow Y23 in FIG. 7).

In this way, the second battery case 20A is overlapped on the first battery case 10A and the insides thereof are communicated with each other by the first communication port 51 and the second communication port 52, and further the gas discharge valve 53 (first gas discharge valve 53R, second gas discharge valve 53L) is provided only in the second battery case 20A, in such a manner that it is possible to limit the gas flow path while reducing the number of gas discharge valves 53. Therefore, the gas in the battery pack 1 can be discharged without providing a special product such as a duct, and thus the size of the battery pack 1 can be suppressed. Further, by providing the gas discharge valve 53 in the second battery case 20A located on the second floor, gas can be discharged more effectively from the gas discharge valve 53 than in the case where the gas discharge valve 53 is provided in the first battery case 10A. Further, the gas discharge valve 53 can be arranged at a high position, and thus the gas discharge valve 53 can be suppressed from being submerged.

Further, by using the first communication port 51 and the second communication port 52 in which the conductive member 14 is arranged as a gas passage when thermal runaway occurs, it is not necessary to process a new through-hole for establishing a gas flow path, and thus the manufacturing cost and man-hours can be reduced.

In the front-rear direction, it is preferable that the first communication port 51 and the second communication port 52 be arranged between the two left and right first front battery modules 11F arranged on the front side of the first battery case 10A and the four left and right first rear battery modules 11R arranged from the center to the rear of the first battery case 10A. As a result, the influence of the gas ejected from any battery cell 11a in the first front battery module 11F on the first rear battery module 11R can be small and the influence of the gas ejected from any battery cell 11a of the first rear battery module 11R on the first front battery module 11F can be small.

Further, the first communication port 51 and the second communication port 52 are arranged outside the first battery module 11 and the second battery module 21 located on the outermost side in the left-right direction (vehicle width direction). Therefore, the distance from the first communication port 51 to the first gas discharge valve 53R and the distance from the second communication port 52 to the second gas discharge valve 53L can be shortened.

Further, the battery pack 1 is provided with a temperature sensor 55 for detecting thermal runaway of the battery cells 11a and 21a. In the embodiment, as illustrated in FIG. 5, a temperature sensor 55C provided in the substantially center of the first battery case 10A, a temperature sensor 55A in the vicinity of the first communication port 51 of the first battery case 10A and on the first gas flow path 61, a temperature sensor 55A in the vicinity of the second communication port 52 of the first battery case 10A and on the second gas flow path 62, and a temperature sensor 55B provided at the substantial center of the second battery case 20A in the left-right direction and on the third gas flow path 63 are provided.

As a result, even when thermal runaway occurs in any battery cell 11a of the first battery case 10A described with reference to FIG. 6, the thermal runaway can be detected mainly by the temperature sensor 55A arranged on the first gas flow path 61 or the temperature sensor 55A arranged on the second gas flow path 62. Further, even when thermal runaway occurs in any battery cell 21a of the second battery case 20A described with reference to FIG. 7, the thermal runaway can be detected mainly by the temperature sensor 55B arranged on the third gas flow path 63. In particular, by arranging the two temperature sensors 55A in the vicinities of the first communication port 51 and the second communication port 52, respectively, thermal runaway can be detected at an early stage.

The number and arrangement of the temperature sensors 55 are not particularly limited, but it is desired that a small number of temperature sensors can detect both the thermal runaway in the battery cell 11a of the first battery case 10A and the thermal runaway in the battery cell 21a of the second battery case 20A. Therefore, in a first modification example of FIG. 8, one temperature sensor 55C is provided in the substantially center of the first battery case 10A and one temperature sensor 55B is provided in the substantially center of the second battery case 20A in the left-right direction and on the third gas flow path 63.

Figure 9:
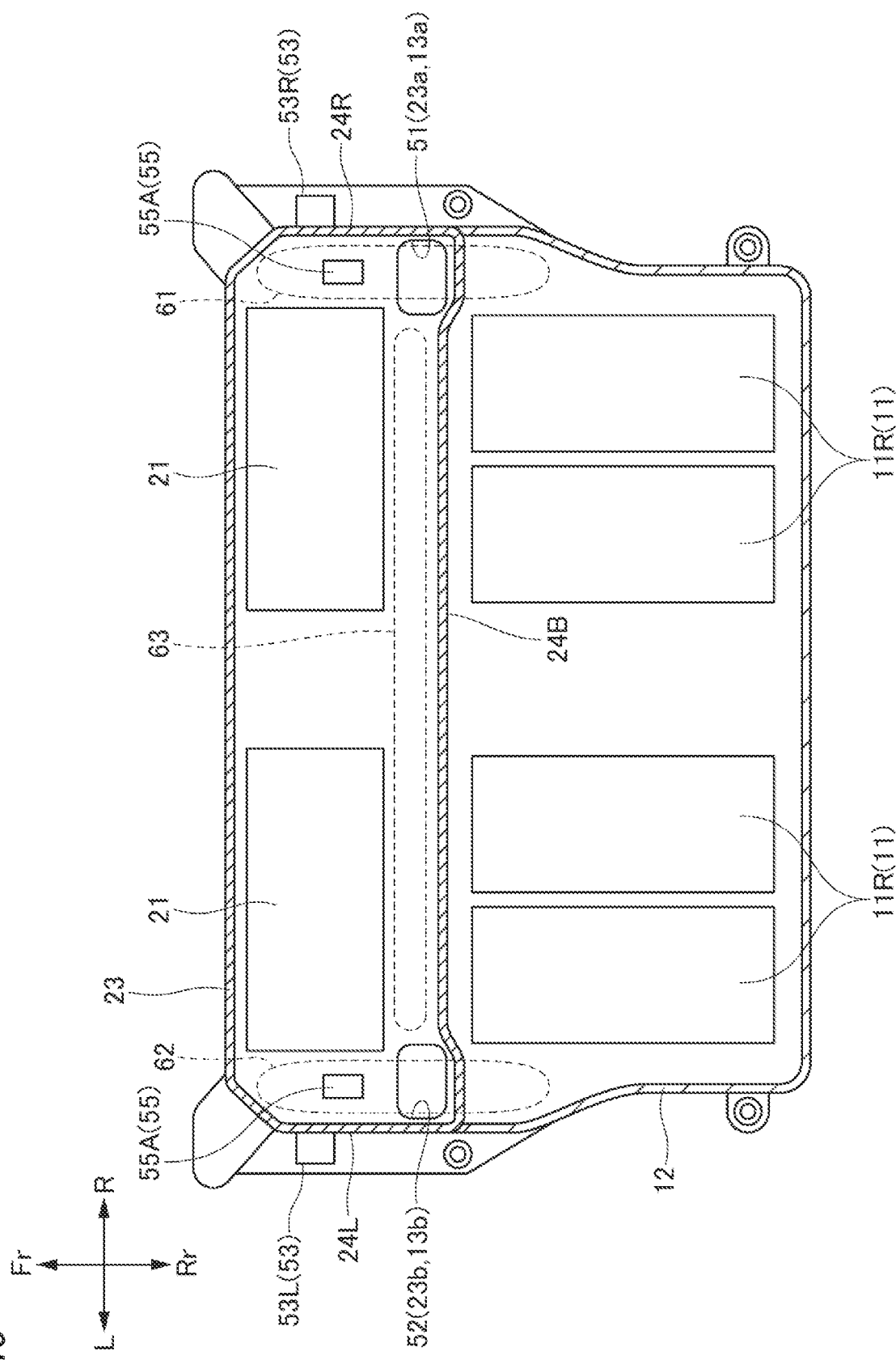
FIG. 9 is a plan view of a battery pack of a second modification example with a first case cover and a second case cover removed.

Further, in a second modification example of FIG. 9, one temperature sensor 55A in the vicinity of the first gas discharge valve 53R of the second battery case 20A and on the first gas flow path 61 and one temperature sensor 55A in the vicinity of the second gas discharge valve 53L of the second battery case 20A and on the second gas flow path 62 are provided. It is preferable that those two temperature sensors 55A are respectively arranged in the vicinities of the first gas discharge valve 53R and the second gas discharge valve 53L. As a result, the accuracy of detecting thermal runaway can be improved.

In the battery pack 1 of the embodiment, since two communication ports (first communication port 51 and second communication port 52) and two gas discharge valves 53 (first gas discharge valve 53R and second gas discharge valve 53L) are provided, it is preferable that at least two temperature sensors 55 are provided. However, in a battery pack having one communication port and one gas discharge valve, it is sufficient that at least one temperature sensor 55 is provided on the gas flow path connected to the gas discharge valve.

Figure 10:
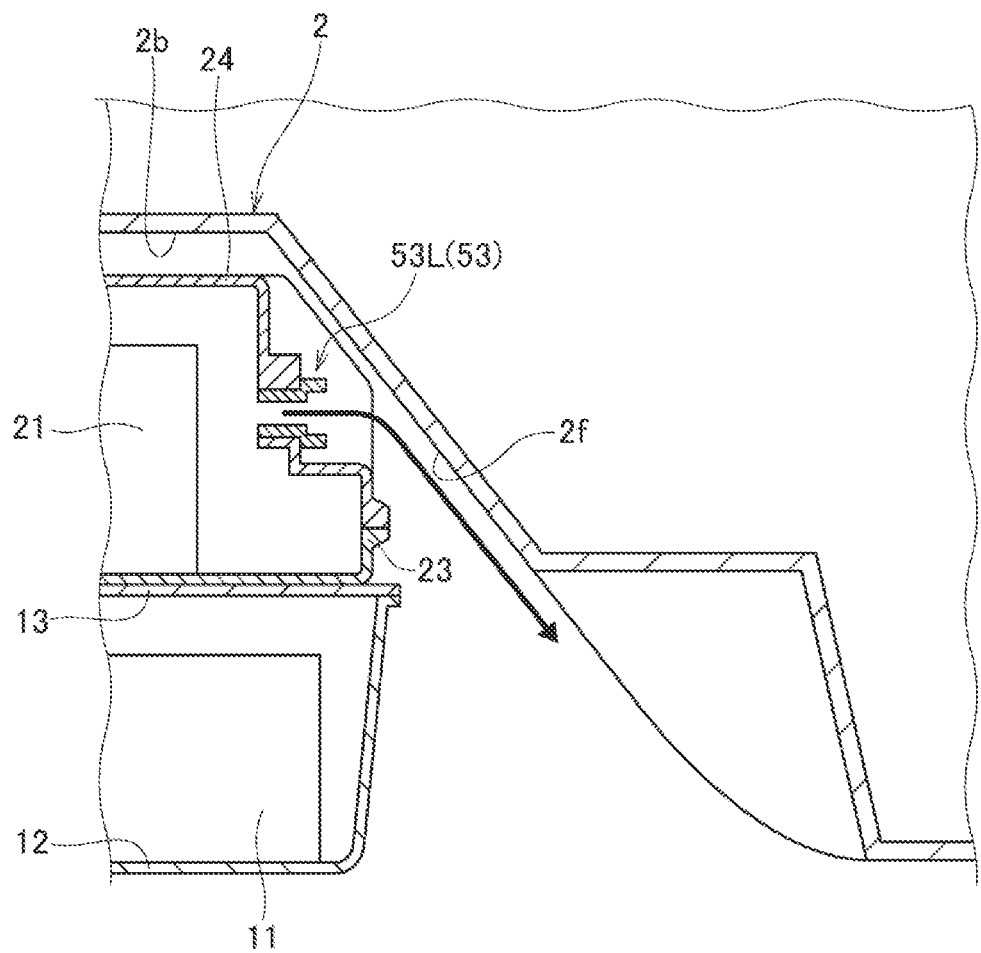
FIG. 10 is a view below a floor panel of a vehicle for explaining flow of gas discharged from a gas discharge valve.
Figure 10:
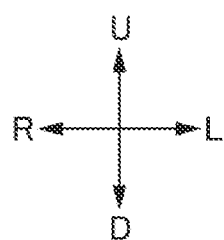

The battery pack 1 is arranged below the floor panel 2 as described above. In this case, the gas discharge valve 53 is arranged on the lateral side of the battery pack 1 so as to face the vehicle width direction. In the embodiment, as illustrated in FIG. 10, the second gas discharge valve 53L is arranged on the left surface 24L of the second case cover 24 and is arranged so as to face to the left. Although not illustrated, the first gas discharge valve 53R is arranged on the right surface 24R of the second case cover 24 and is arranged so as to face right in the vehicle width direction.

As a result, the gas is not directly discharged toward the floor panel 2 on the passenger compartment side, so that the influence of the gas on the passenger compartment 4 can be suppressed. In particular, the vertical wall portion 2e facing the battery pack 1 exists in front of the battery pack 1 and the fuel tank 9 is provided behind the battery pack 1. Therefore, the influence of the ejected gas on the passenger compartment 4 can be suppressed and the gas ejected from the first gas discharge valve 53R and the second gas discharge valve 53L can be prevented from hitting the fuel tank 9. The first gas discharge valve 53R and the second gas discharge valve 53L are preferably arranged at positions far from the fuel tank 9, that is, at front ends of the right surface 24R and the left surface 24L of the second case cover 24.

Further, as illustrated in FIG. 10, it is preferable that floor surfaces 2f of the floor panel 2 facing the first gas discharge valve 53R and the second gas discharge valve 53L are inclined downward as they go away from the gas discharge valve 53. As a result, the gas ejected from the first gas discharge valve 53R and the second gas discharge valve 53L can be guided in a direction (downward) away from the passenger compartment 4 while being applied to the floor surfaces 2*f*.

The present invention is not limited to the embodiment described above and can be appropriately modified, improved, and the like.

Further, the battery pack of the present invention may include an air conditioning duct such as an intake duct and an exhaust duct.

Further, in the embodiment described above, a hybrid vehicle is exemplified as the vehicle, but the vehicle is not limited to this, and an electric vehicle such as an electric automobile or a fuel cell vehicle may be used as long as it has a battery.

In addition, at least the following matters are described in this specification. The components and the like corresponding to those of the embodiments described above are shown in parentheses, but the present invention is not limited thereto.

(1) A battery pack (battery pack 1) including:

a first battery case (first battery case 10A) accommodating a plurality of cells (battery cells 11*a*), and a second battery case (second battery case 20A) laminated above the first battery case and accommodating a plurality of cells (battery cells 21*a*), where the first battery case has a first through-hole (right through-hole 13*a*, left through-hole 13*b*) on an upper surface (first case cover 13), the second battery case has a second through-hole (right through-hole 23*a*, left through-hole 23*b*) on a bottom surface (bottom plate 23) which communicates with the first through-hole, and the battery pack includes, a communication port (first communication port 51, second communication port 52) composed of the first through-hole and the second through-hole, a gas discharge valve (gas discharge valve 53) which is provided only in either the first battery case or the second battery case and opens when internal pressure of the battery pack is higher than a predetermined value, and a temperature sensor (temperature sensor 55) provided on a gas flow path (first gas flow path 61, second gas flow path 62, third gas flow path 63) connected to the gas discharge valve.

According to (1), the second battery case is laminated on the first battery case and the insides thereof are communicated with each other through the communication port, and further the gas discharge valve is provided in only one of the first battery case and the second battery case, in such a manner that it is possible to limit the gas flow path while reducing the number of gas discharge valves. By discharging the gas without providing the duct in this way, it is possible to suppress the increase in size of the battery pack. In addition, by installing the temperature sensor on the gas flow path connected to the gas discharge valve, the occurrence of thermal runaway can be detected appropriately.

(2) The battery pack according to (1), where the temperature sensor is arranged in a vicinity of the gas discharge valve or in a vicinity of the communication port.

According to (2), when the temperature sensor is placed in the vicinity of the communication port, thermal runaway can be detected at an early stage. In addition, when the temperature sensor is placed in the vicinity of the gas discharge valve, the accuracy of detecting thermal runaway can be improved.

(3) The battery pack according to (1) or (2), where the plurality of cells accommodated in the first battery case and the plurality of cells accommodated in the second battery case each have a gas release valve (gas release valve 11*b*, 21*b*) on an upper surface, and the gas discharge valve is provided in the second battery case.

According to (3), since the gas easily flows upward, by arranging the gas release valve on the upper surface of each cell and providing the gas discharge valve in the second battery case located on the second floor, the gas can be effectively discharged from the gas discharge valve. In addition, the gas discharge valve can be placed at a high position to prevent the gas discharge valve from being submerged.

(4) The battery pack according to any one of (1) to (3), where a conductive member (conductive member 14) which electrically connects the plurality of cells accommodated in the first battery case and the plurality of cells accommodated in the second battery case is arranged in the communication port.

According to (4), by using the communication port in which the conductive member is arranged as a gas passage, it is not necessary to process a new communication port for establishing a gas flow path, and thus the manufacturing cost and man-hours can be reduced.

(5) An electric vehicle which includes the battery pack according to any one of (1) to (4), where the battery pack is arranged below a floor panel (floor panel 2), and the gas discharge valve is provided on a lateral side (left surface 24L, right surface 24R) of the battery pack in a vehicle width direction.

According to (5), since the gas discharge valve is provided on the lateral side of the battery pack arranged below the floor panel, and thus the gas is not discharged directly toward the floor panel on the passenger compartment side. Therefore, the influence of the gas on the passenger compartment can be suppressed. That is, it is possible to prevent the floor panel under the seat from being damaged or becoming hot.

(6) The electric vehicle according to (5), where a floor surface (floor surface 2*f*) facing the gas discharge valve of the floor panel is inclined downward as it goes away from the gas discharge valve.

According to (6), the floor surface facing the gas discharge valve is inclined downward as it goes away from the gas discharge valve. Therefore, the gas ejected from the gas discharge valve can be guided in a direction away from the passenger compartment while being applied to the floor surface.

(7) The electric vehicle according to (5) or (6), where the first battery case includes at least two battery modules (first front battery module 11F, first rear battery module 11R) arranged side by side in a front-rear direction of the electric vehicle, and the communication port is arranged between the two battery modules adjacent to each other in the front-rear direction.

According to (7), the influence of the ejected gas on other battery modules can be suppressed.

(8) The electric vehicle according to any one of (5) to (7), where the first battery case accommodates a plurality of battery modules (battery modules 11) in which the plurality of cells are stacked, and the communication port is arranged outside in the vehicle width direction with respect to the battery module located on an outermost side in the vehicle width direction.

According to (8), the distance between the communication port and the gas discharge valve provided on the lateral side of the battery pack can be shortened.

(9) The electric vehicle according to any one of (5) to (8), where the battery pack is arranged below a rear seat (rear seat 8), and the floor panel has a vertical wall portion (vertical wall portion 2e) facing the battery pack in front of the battery pack.

According to (9), since the floor panel has the vertical wall portion facing the battery pack in front of the battery pack, by providing the gas discharge valve on the lateral side of the battery pack, the influence of gas on the passenger compartment can be further suppressed.

(10) The electric vehicle according to (9), where a fuel tank (fuel tank 9) is provided behind the battery pack.

According to (10), the fuel tank is provided behind the battery pack. Therefore, by providing the gas discharge valve on the lateral side of the battery pack, it is possible to prevent the gas ejected from the gas discharge valve from hitting the fuel tank.

(11) The electric vehicle according to (10), where the gas discharge valve is located at a front end of a lateral side of the second battery case.

According to (11), the gas discharge valve can be kept away from the fuel tank.

What is claimed is:

1. A battery pack comprising:
a first battery case accommodating a plurality of cells; and
a second battery case laminated above the first battery case and accommodating a plurality of cells, wherein
the first battery case has a first through-hole on an upper surface,
the second battery case has a second through-hole on a bottom surface which communicates with the first through-hole, and
the battery pack includes,
a communication port composed of the first through-hole and the second through-hole,
a gas discharge valve which is provided only in either the first battery case or the second battery case and opens when internal pressure of the battery pack is higher than a predetermined value, and
a temperature sensor provided on a gas flow path connected to the gas discharge valve.

2. The battery pack according to claim 1, wherein
the temperature sensor is arranged in a vicinity of the gas discharge valve or in a vicinity of the communication port.

3. The battery pack according to claim 1, wherein
the plurality of cells accommodated in the first battery case and the plurality of cells accommodated in the second battery case each have a gas release valve on an upper surface, and
the gas discharge valve is provided in the second battery case.

4. The battery pack according to claim 1, wherein
a conductive member which electrically connects the plurality of cells accommodated in the first battery case and the plurality of cells accommodated in the second battery case is arranged in the communication port.

5. An electric vehicle which includes the battery pack according to claim 1, wherein
the battery pack is arranged below a floor panel, and
the gas discharge valve is provided on a lateral side of the battery pack in a vehicle width direction.

6. The electric vehicle according to claim 5, wherein
a floor surface facing the gas discharge valve of the floor panel is inclined downward as it goes away from the gas discharge valve.

7. The electric vehicle according to claim 5, wherein
the first battery case includes at least two battery modules arranged side by side in a front-rear direction of the electric vehicle, and
the communication port is arranged between the two battery modules adjacent to each other in the front-rear direction.

8. The electric vehicle according to claim 5, wherein
the first battery case accommodates a plurality of battery modules in which the plurality of cells are stacked, and
the communication port is arranged outside in the vehicle width direction with respect to the battery module located on an outermost side in the vehicle width direction.

9. The electric vehicle according to claim 5, wherein
the battery pack is arranged below a rear seat, and
the floor panel has a vertical wall portion facing the battery pack in front of the battery pack.

10. The electric vehicle according to claim 9, wherein
a fuel tank is provided behind the battery pack.

11. The electric vehicle according to claim 10, wherein
the gas discharge valve is located at a front end of a lateral side of the second battery case.

* * * * *